United States Patent
Ye et al.

(10) Patent No.: US 12,221,995 B2
(45) Date of Patent: Feb. 11, 2025

(54) ANTI-LOOSENING BOLT AND NUT ASSEMBLY

(71) Applicant: Changtai Yike Technology Co., Ltd., Fujian (CN)

(72) Inventors: Shukeng Ye, Fujian (CN); Wei Zhang, Fujian (CN)

( * ) Notice: Subject to any disclaimer, the term of this patent is extended or adjusted under 35 U.S.C. 154(b) by 175 days.

(21) Appl. No.: 18/085,590

(22) Filed: Dec. 21, 2022

(65) Prior Publication Data

US 2024/0110591 A1    Apr. 4, 2024

(30) Foreign Application Priority Data

Sep. 30, 2022  (CN) .......................... 202222601450.9

(51) Int. Cl.
*F16B 39/10*    (2006.01)
*F16B 39/28*    (2006.01)

(52) U.S. Cl.
CPC .............. *F16B 39/28* (2013.01); *F16B 39/10* (2013.01)

(58) Field of Classification Search
CPC ................................ F16B 39/028; F16B 39/10
USPC ........ 411/204, 209, 210, 315, 316, 265–270, 411/926
See application file for complete search history.

(56) References Cited

U.S. PATENT DOCUMENTS

| | | | | |
|---|---|---|---|---|
| 765,247 A * | 7/1904 | McComb | ............... | F16B 39/06 411/926 |
| 824,219 A * | 6/1906 | Di Vito | ................... | F16B 39/36 411/935 |
| 879,958 A * | 2/1908 | Gutridge | ............... | F16B 37/047 411/222 |
| 1,326,598 A * | 12/1919 | Jaques | .................... | F16B 39/36 411/270 |
| 1,519,836 A * | 12/1924 | Herschler | ............... | F16B 39/36 411/270 |
| 1,750,523 A * | 3/1930 | Kaschtofsky | ........... | F16B 39/10 411/944 |
| 1,801,846 A * | 4/1931 | Campbell | ............... | F16B 39/10 411/925 |
| 2,191,201 A * | 2/1940 | Kass | ....................... | F16B 39/36 411/269 |
| 5,154,560 A * | 10/1992 | Copito | .................... | F16B 39/12 411/266 |

* cited by examiner

*Primary Examiner* — Flemming Saether

(57) ABSTRACT

An anti-loosening bolt and nut assembly includes a bolt, a nut, and a locking member. A screw rod of the bolt has an upper portion formed with an external thread and a lower portion formed with a retaining section. The nut has an upper cavity formed with an internal thread and a lower portion formed with a locking section. The locking section has elasticity. When the locking section is pressed, the locking section is in tight fit with the retaining section. The locking member is sleeved on the locking section. The locking member has an inner cavity with a tapered section. When the locking member is rotated, the nut is moved axially for the tapered section to be pressed against the locking section tightly. The bolt and nut assembly provides an anti-loosening effect, has few parts, and can be operated easily in a narrow space.

10 Claims, 5 Drawing Sheets

ANTI-LOOSENING BOLT AND NUT ASSEMBLY

BACKGROUND OF THE INVENTION

1. Field of the Invention

The present invention relates to locking fittings, and more particularly to an anti-loosening bolt and nut assembly.

2. Description of the Prior Art

A bolt and nut assembly is widely used for the assembly of various equipment and furniture. For installing a toilet, bolts and nuts are often used to lock a toilet seat with a cover on a toilet bowl. Conventional bolts and nuts are tightened by threaded connection, without any additional anti-loosening manner. In use, the cover will be subjected to impact, vibration, and left and right swing due to frequent opening and closing. As a result, the nut is easily loosened, which in turn causes the cover to be loosened, resulting in a poor user experience.

When the toilet seat with the cover is to be locked on the toilet bowl, bolts are inserted through the mounting holes of the toilet seat with the cover and the toilet bowl in an upper-to-lower direction. Then, nuts are screwed to the bolts behind the toilet bowl. Due to the narrow space behind the toilet bowl, the installation operation is restricted greatly. The existing bolt and nut assemblies with an anti-loosing configuration generally have the disadvantages of many parts and troublesome operation, and are not suitable for locking the toilet seat with the cover on the toilet bowl. Chinese Patent Publication No. CN213711570U discloses an anti-dropping high-performance fastener, as shown in FIG. 1, including a bolt, a restricting member, a locking member 3, and a nut 4. One end face of the screw rod 1-2 of the bolt is formed with a bolt counterbore 1-4. The restricting member is arranged at the end of the bolt 1, including a restricting cylinder 2-1 and a restricting block 2-2. The locking member 3 includes a locking screw rod threadedly connected to the inner thread 1-5 of the counterbore. The end face of the locking block 3 abuts against the end face of the restricting cylinder 2-1. The nut 4 is arranged on the outer side of the screw rod 1. The bottom of the restricting block 2-2 is inserted into the hole of the nut. In the above structure, the locking member is threadedly connected to the bolt 1 to realize the restriction of the restricting member, and then the restricting block 2-2 of the restricting member is configured to restrict the nut 4 in the circumferential direction, so as to prevent the nut 4 from rotating to achieve the anti-loosening function. The above-mentioned patent includes at least four accessories such as a bolt, a restricting member, a locking member 3 and a nut 4. The operation is troublesome and the efficiency is low in assembly. It is necessary to screw the locking member 3 in the axial direction of the locking member 3 for the locking member 3 to be threadedly connected to the bolt counterbore 1-4. The length of the tool itself needs a large operating space. The fastener is not suitable for locking the toilet seat with the cover on the toilet bowl.

SUMMARY OF THE INVENTION

The primary object of the present invention is to provide an anti-loosening bolt and nut assembly, which has an anti-loosening effect, has few parts, can be operated without tools, and is suitable for locking operations in a narrow space.

In order to achieve the above object, the present invention adopts the following technical solutions:

An anti-loosening bolt and nut assembly comprises a bolt, a nut, and a locking member. The bolt includes a bolt head and a screw rod. The screw rod has an upper portion formed with an external thread and a lower portion formed with a retaining section. The nut has an upper cavity formed with an internal thread matching the external thread and a lower portion formed with a locking section. The locking section has elasticity. When the locking section is pressed, the locking section is in tight fit with the retaining section to form a circumferential restriction. The locking member is sleeved on an outer periphery of the locking section. The locking member has an inner cavity with a tapered section. When the locking member is applied with a force to rotate and move up and down in an axial direction of the nut, the tapered section compresses or releases the locking section.

The retaining section includes a plurality of external teeth arranged along an axial direction of the bolt. The locking section includes a plurality of internal teeth arranged along the axial direction of the nut. When the locking section is in tight fit with the retaining section, the external teeth are meshed with the internal teeth.

A bottom end of the locking section is formed with at least two slots extending upward along the axial direction of the nut.

At least two flanges are circumferentially disposed on a peripheral surface of the nut. At least two hooks are disposed on an upper end of the inner cavity of the locking member. The hooks are configured to be engaged with the flanges, respectively.

Preferably, the flanges each have an upper surface including a rising segment and a horizontal segment connected to a distal end of the rising segment. When the locking member is rotated and the hooks are moved along the rising segments of the respective flanges, the rising segments enable the locking member to move axially relative to the nut.

Preferably, a front end of the rising segment is formed with a restricting step protruding upward along the axial direction of the nut. The restricting step is configured to prevent the corresponding hook from being detached from the rising segment.

Preferably, a spherical protrusion is disposed at a junction of the rising segment and the horizontal segment.

Preferably, an opening is disposed between the flanges. The opening has a width not less than a width of the corresponding hook.

The tapered section is a slope that is gradually tapered downward and arranged at a lower end of the inner cavity of the locking member.

A plurality of lugs is disposed on a peripheral surface of the locking member. The lugs are arranged along an axial direction of the locking member.

The bolt, the nut and the locking member are made of a plastic material.

After adopting the above-mentioned technical solutions, the present invention has the following technical effects:

1. The present invention is only composed of three parts, namely, the bolt, the nut and the locking member. By arranging the locking section with elasticity and compressive deformation at the lower portion of the nut, when the locking member is manually rotated, the tapered section of the locking member can be pressed against the locking section, so that the locking section is in tight fit with the retaining section to form the circumferential restriction of the bolt and the nut, so as to achieve the purpose of preventing the bolt and the nut from loosening.

2. In the present invention, the operation of pressing and releasing the locking section can be achieved only by manually rotating the locking member. There is no need to use a tool. The operation is simple, with high efficiency. The present invention is more suitable for assembly operations in narrow spaces, such as installing a toilet seat with a cover on a toilet bowl and performing locking operations behind the toilet bowl.

DETAILED DESCRIPTION OF THE PREFERRED EMBODIMENTS

Figure 1:
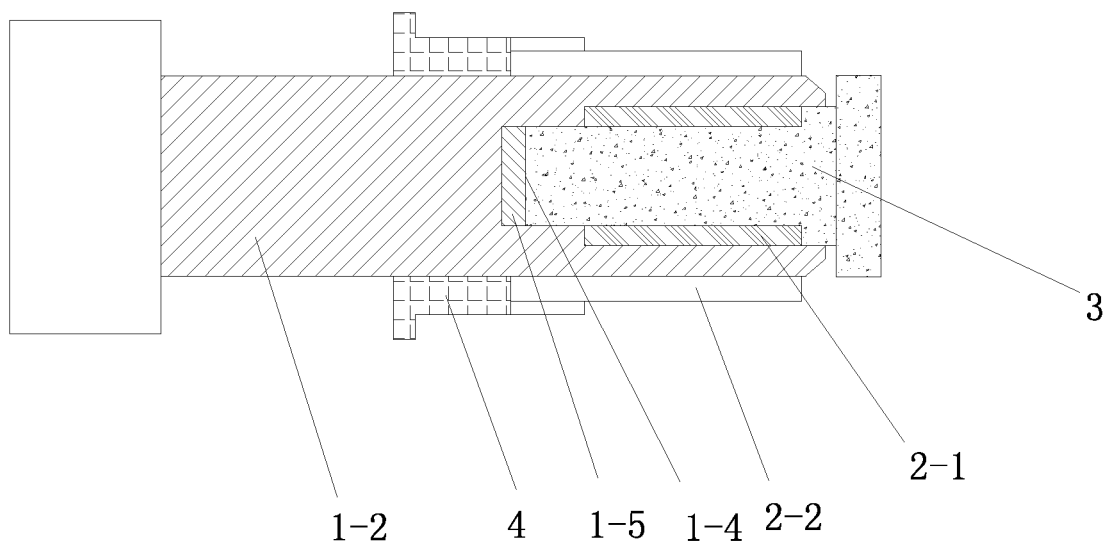
FIG. 1 is a partial schematic view of the anti-dropping high-performance fastener as disclosed in Chinese Patent Publication No. CN213711570U.
Figure 2:
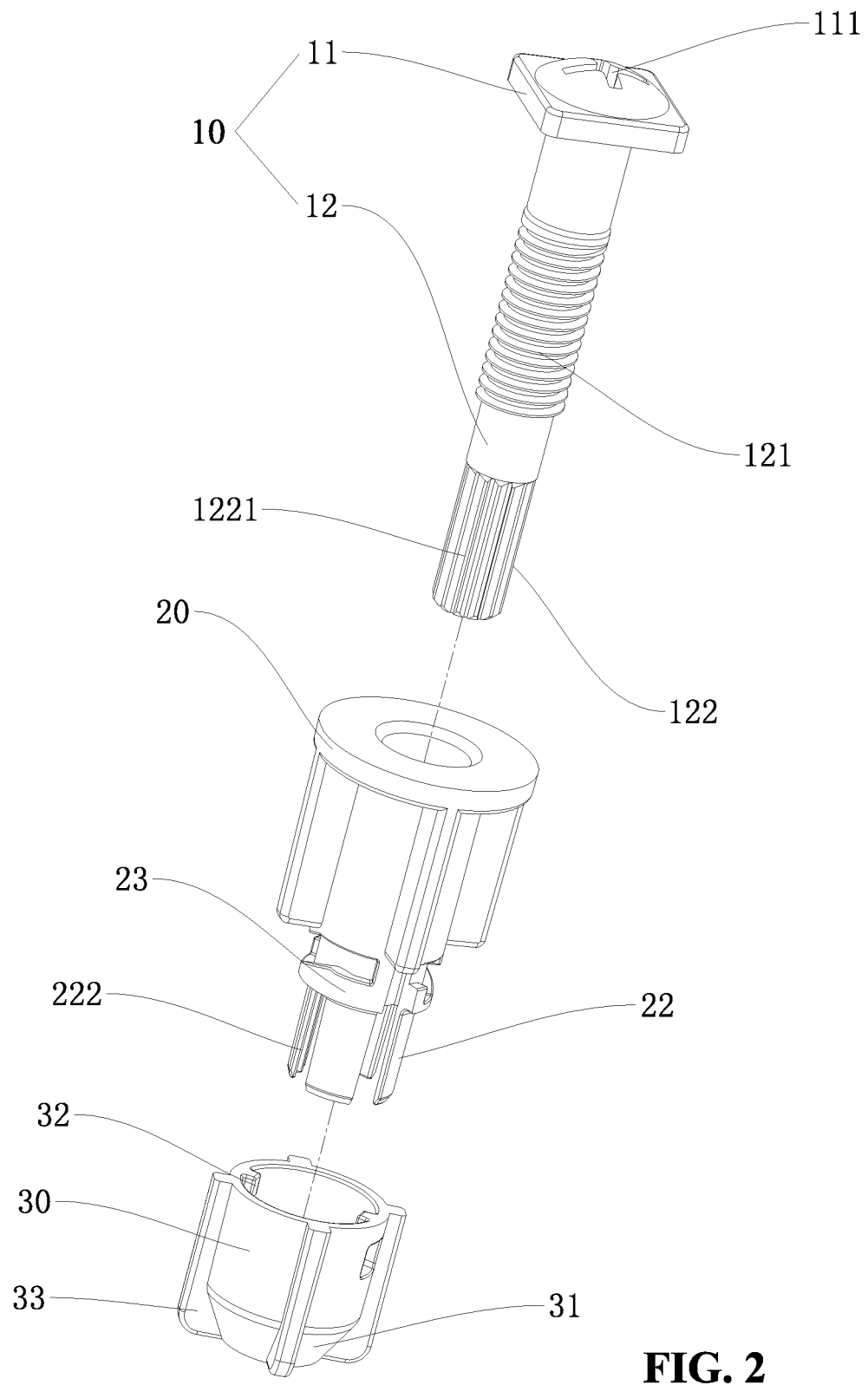
FIG. 2 is an exploded view according to an embodiment of the present invention.

Embodiments of the present invention will now be described, by way of example only, with reference to the accompanying drawings.

Referring to FIG. 2 through FIG. 5, the present invention discloses an anti-loosening bolt and nut assembly, comprising a bolt 10, a nut 20 and a locking member 30.

The bolt 10 includes a bolt head 11 and a screw rod 12. The screw rod 12 has an upper portion formed with an external thread 121 and a lower portion formed with a retaining section 122.

The nut 20 has an upper cavity formed with an internal thread 21 matching the external thread 121 and a lower portion formed with a locking section 22. The locking section 22 has elasticity. When the locking section 22 is pressed, the locking section 22 is in tight fit with the retaining section 122 to form a circumferential restriction.

The locking member 30 is sleeved on the outer periphery of the locking section 22. The locking member 30 has an inner cavity with a tapered section 31. When the locking member 30 is applied with a force to rotate and move up and down in the axial direction of the nut 20, the tapered section 31 compresses or releases the locking section 22.

Specific embodiments of the present invention are shown below.

The retaining section 122 includes a plurality of external teeth 1221 arranged along the axial direction of the bolt 10. The locking section 22 includes a plurality of internal teeth 221 arranged along the axial direction of the nut 20. When the locking section 22 is in tight fit with the retaining section 122, the external teeth 1221 are meshed with the internal teeth 221, so that the bolt 10 and the nut 20 cannot rotate relative to each other, so as to form the circumferential restriction.

The bottom end of the locking section 22 is formed with at least two slots 222 extending upward along the axial direction of the nut 20, so that the locking section 22 is divided into several deformable pieces to ensure that the locking section 22 has elasticity to be deformed inwardly when pressed for the locking section 22 to be in tight fit with the surface of the retaining section 122.

At least two flanges 23 are circumferentially disposed on the peripheral surface of the nut 20. At least two hooks 32 are disposed on the upper end of the inner cavity of the locking member 30. The hooks 32 are engaged with the flanges 23 to form an axial restriction of the locking member 30 and the nut 20. In this way, the locking member 30 won't be loosened from the nut 20, and parts won't be lost.

Figure 3:
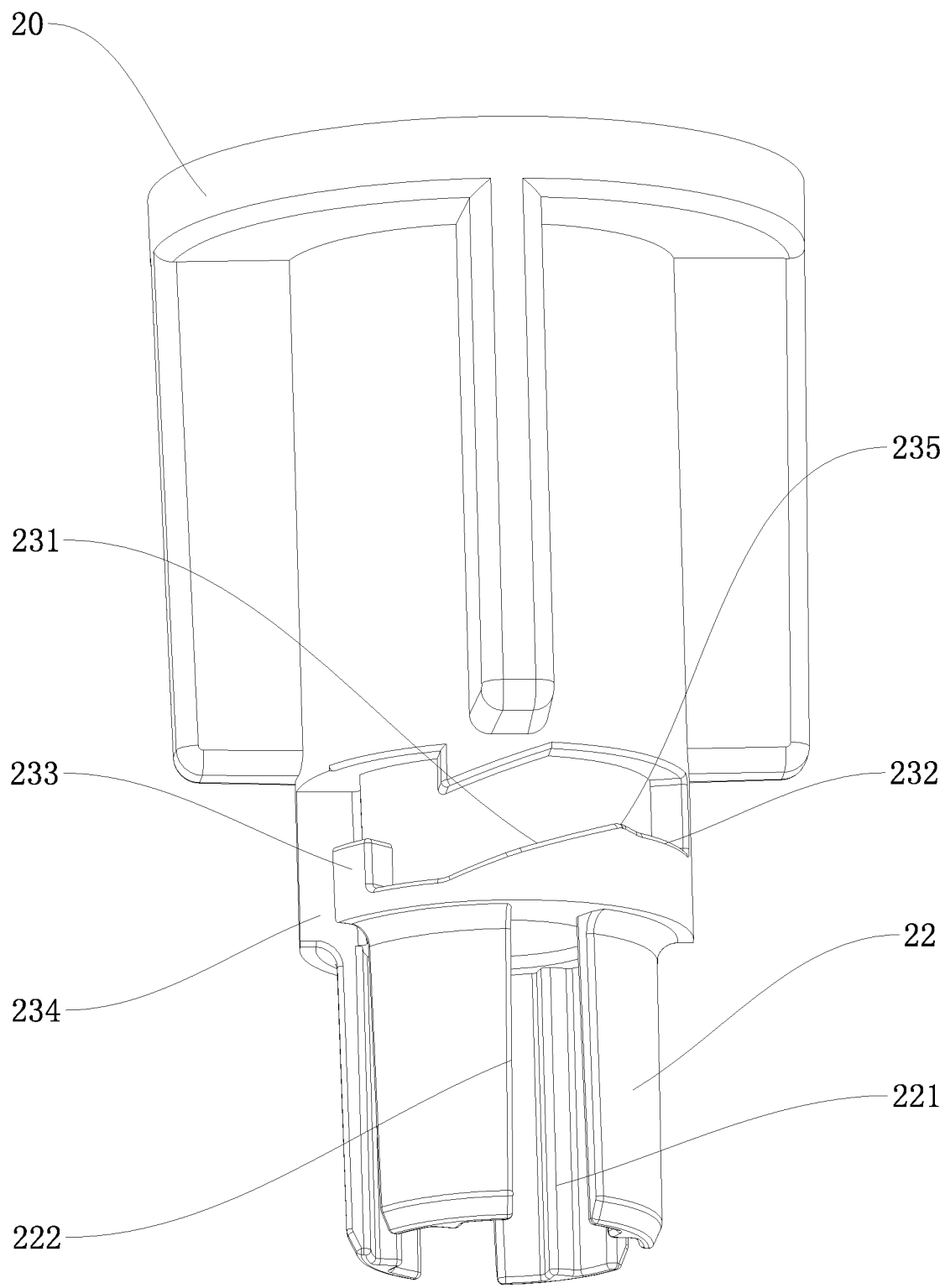
FIG. 3 is a perspective view according to the embodiment of the present invention.
Figure 4:
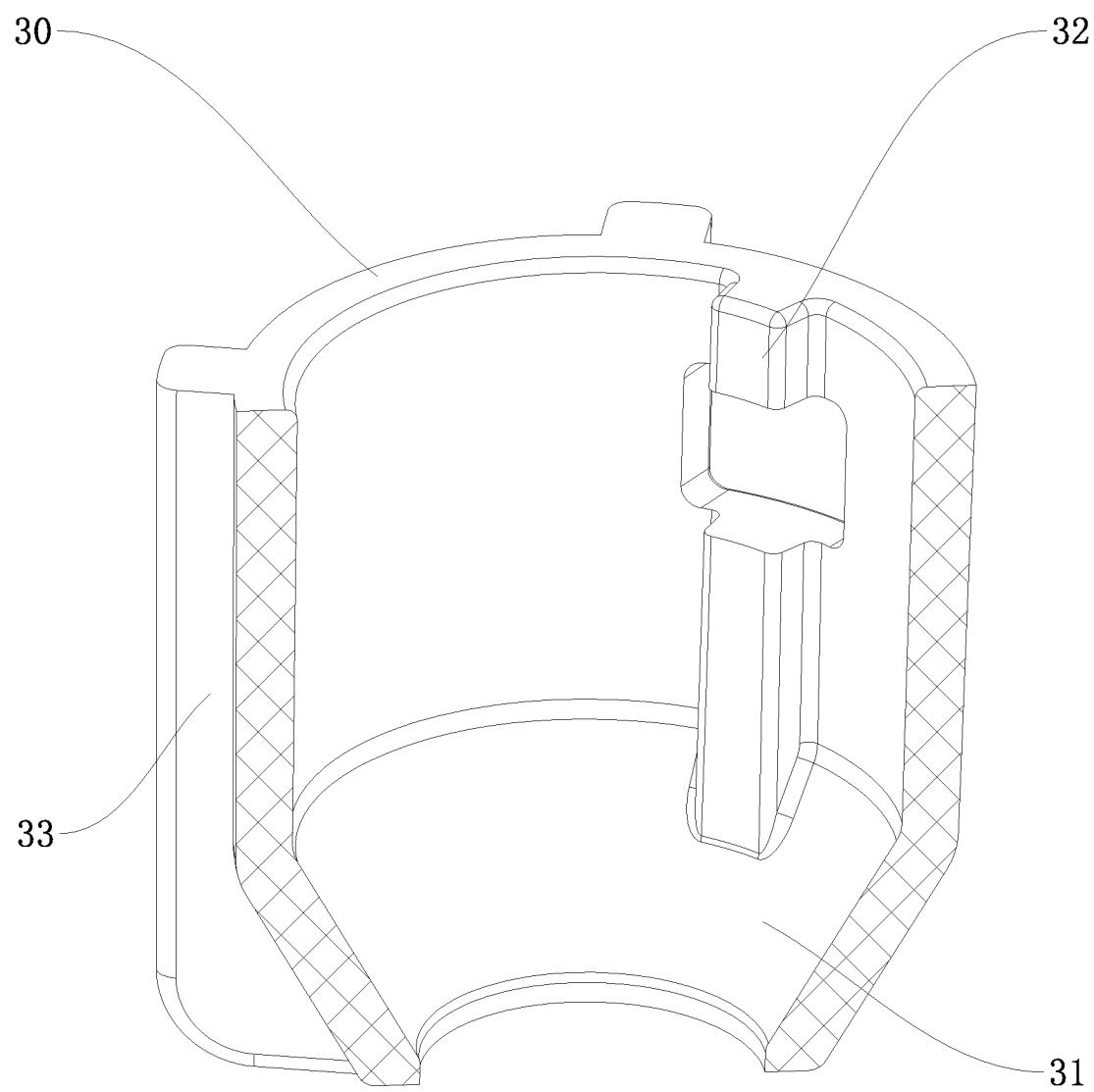
FIG. 4 is a cross-sectional view of the locking member according to the embodiment of the present invention.
Figure 5:
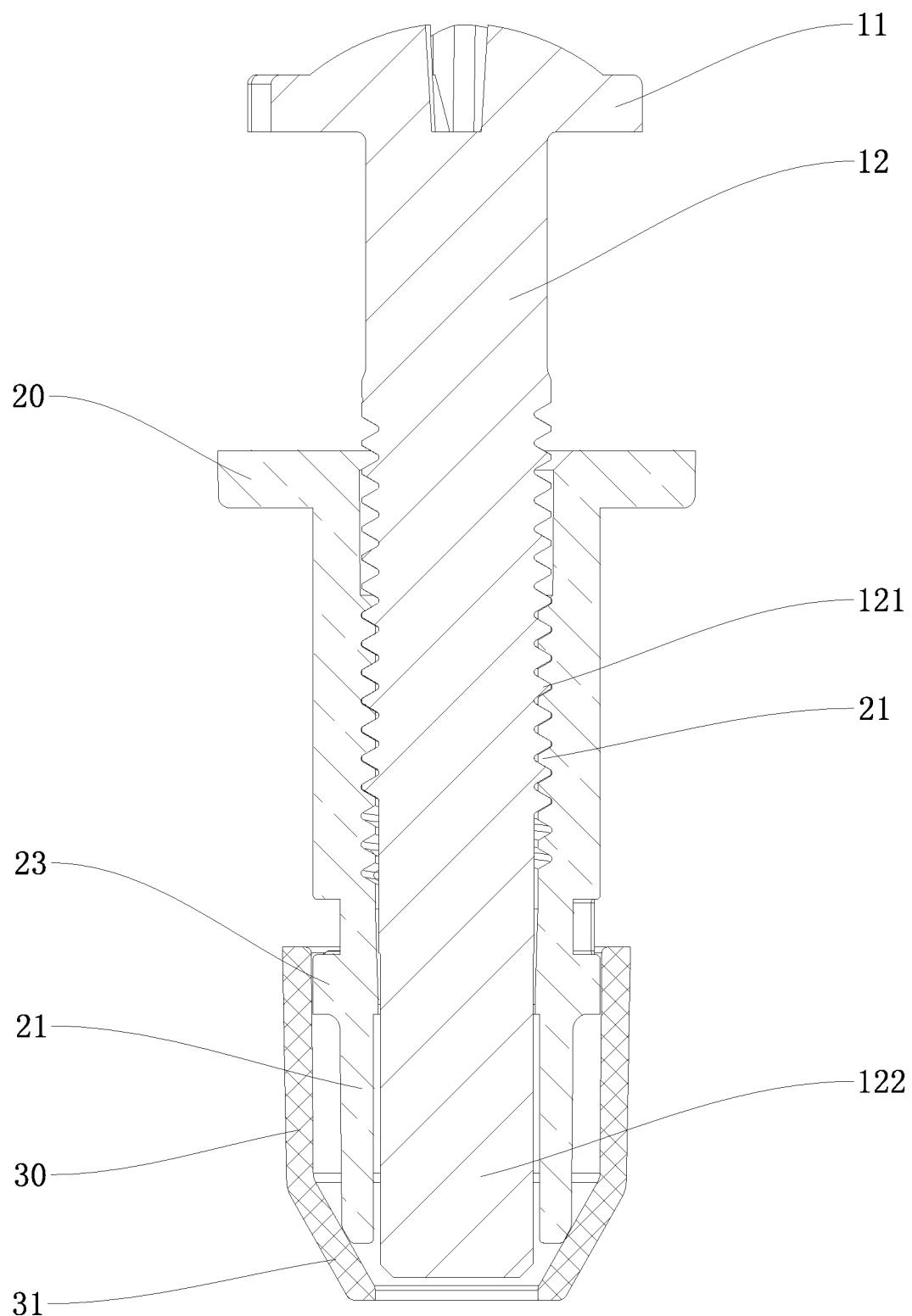
FIG. 5 is a cross-sectional view according to the embodiment of the present invention.

Further, referring to FIG. 3, the upper surface of the flange 23 includes a rising segment 231 and a horizontal segment 232 connected to the distal end of the rising segment 231. When the locking member 30 is rotated and the hooks 32 are moved along the rising segments 231 of the respective flanges 23, the rising segments 231 enable the locking member 30 to move axially relative to the nut 20 for the tapered section 31 to compress or release the locking section 22 to achieve the purpose of anti-loosening or unlocking.

Secondly, the front end of the rising segment 231 is formed with a restricting step 233 protruding upward along the axial direction of the nut 20. The restricting step 233 is configured to prevent the corresponding hook 32 from being detached from the rising segment 231 downward, thereby preventing the locking member 30 from being disengaged from the nut 20.

Furthermore, an opening 234 is disposed between the adjacent flanges 23. The width of the opening 234 is not less than the width of the hook 32, so that the hook 32 can pass through the opening 234. It is convenient for the hook 32 to pass over the flange 23 when installing or removing the locking member 30.

Finally, a spherical protrusion 235 is disposed at the junction of the rising segment 231 and the horizontal segment 232. The spherical protrusion 235 is configured to lock the hook 32 on the horizontal segment 232, so as to prevent the locking member 30 from being unfastened. Only when a large force is applied to rotate the locking member 30, the hook 32 can be moved to pass over the spherical protrusion 235 to the rising segment 231, thereby unlocking the locking member 30. Besides, the spherical protrusion 235 also facilitates the hook 32 to be moved thereon more smooth.

In addition, the locking member 30 may be threadedly connected to the outer wall of the nut 20. The locking member 30 can be axially moved relative to the nut 20 through the guide of the thread for the tapered section 31 to compress or release the locking section 22 to achieve the purpose of anti-loosening or unlocking.

The tapered section 31 is a slope that is gradually tapered downward and arranged at the lower end of the inner cavity of the locking member 30. When the tapered section 31 is in contact with the locking section 22, it exerts a radial inward force to the locking section 22, so that the locking section 22 is pressed and deformed.

A plurality of lugs 33 is disposed on the peripheral surface of the locking member 30. The lugs 33 are arranged along the axial direction of the locking member 30, so that the torque can be increased when the locking member 30 is manually screwed, and the locking member 30 can be rotated with less effort. Alternatively, an anti-slip pattern may be disposed on the peripheral surface of the locking member 30 to increase the frictional force between the locking member 30 and the operator's fingers/palm when the locking member 30 is operated.

The bolt 10, the nut 20 and the locking member 30 are all made of a plastic material, which can reduce costs and make the locking section 22 of the nut 20 deformed more easily when applied with a force.

The top of the bolt head 11 is formed with a cross groove 111 for matching an operating tool, so that the bolt 10 can be rotated by a cross screwdriver.

The working principle of the present invention is described below.

1. When the locking member 30 is to be installed, the hook 32 of the locking member 30 is first aligned with the opening 234, and the locking member 30 is moved up along the axial direction of the nut 20. When the height of the hook 32 exceeds the restricting step 233, the tapered section 31 is in fit with the locking section 22, and the locking section 22 is pressed and deformed. At this time, the locking member 30 is rotated for the hook 32 to pass over the restricting step 233, and then the locking member 30 is released. Under the action of the deformation and resilience of the locking section 22, the hook 32 passes over the restricting step 233 to be hung on the flange 23 (the front end of the rising segment 231). At this time, the tapered section 31 is separated from the locking section 22, that is, the installation of the locking member 30 and the nut 20 is realized.

2. The bolt 10 is inserted in the nut 20 and rotated relative to the nut 20. After the nut 20 is locked to the bolt 10, the locking member 30 is rotated. The hook 32 is moved along the rising segment 231 of the flange 23, so that the locking member 30 is moved up in the axial direction. Thus, the tapered section 31 is gradually fitted on the locking section 22 and the locking section 22 is pressed to deform, and the external teeth 1221 are gradually to be meshed with the internal teeth 221. When the hook 32 is moved to the horizontal segment 232, the external teeth 1221 are fully meshed with the internal teeth 221. The locking section 22 is in tight fit with the retaining section 122 to fasten the nut 20 on the bolt 10. The locking hook 32 is located on the horizontal segment 232 to prevent the locking member 30 from loosening, so that the nut 20 and the locking member 30 won't be unlocked unintentionally.

With the above solution, the present invention is composed of three parts, namely, the bolt 10, the nut 20 and the locking member 30. By arranging the locking section 22 with elasticity and compressive deformation at the lower portion of the nut 20, when the locking member 30 is manually screwed, the tapered section 31 of the locking member 30 can be pressed against the locking section 22, so that the locking section 22 is in tight fit with the retaining section 122 to form the circumferential restriction of the bolt 10 and the nut 20, so as to achieve the purpose of preventing the bolt 10 and the nut 20 from being loose. In the present invention, the operation of pressing and releasing the locking section 22 can be achieved by screwing the locking member 30 manually. There is no need to use a tool. The operation is simple, with high efficiency. The present invention is more suitable for assembly operations in narrow spaces, such as installing a toilet seat with a cover on a toilet bowl and performing locking operations behind the toilet bowl.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An anti-loosening bolt and nut assembly, comprising a bolt, a nut and a locking member;
the bolt including a bolt head and a screw rod; the screw rod having an upper portion formed with an external thread and a lower portion formed with a retaining section;
the nut having an upper cavity formed with an internal thread matching the external thread and a lower portion formed with a locking section, the locking section having elasticity;
the locking member being sleeved on an outer periphery of the locking section, the locking member having an inner cavity with a tapered section;
wherein when the locking member is screwed manually to rotate and move up and down in an axial direction of the nut, the tapered section compresses or releases the locking section; when the locking section is compressed, the locking section is in tight fit with the retaining section to form a circumferential restriction;
at least two flanges are circumferentially disposed on a peripheral surface of the nut, at least two hooks are disposed on an upper end of the inner cavity of the locking member, and the hooks are configured to be engaged with the flanges, respectively.

2. The anti-loosening bolt and nut assembly as claimed in claim 1, wherein the retaining section includes a plurality of external teeth arranged along an axial direction of the bolt, the locking section includes a plurality of internal teeth arranged along the axial direction of the nut, when the locking section is in tight fit with the retaining section, the external teeth are meshed with the internal teeth.

3. The anti-loosening bolt and nut assembly as claimed in claim 1, wherein a bottom end of the locking section is formed with at least two slots extending upward along the axial direction of the nut.

4. The anti-loosening bolt and nut assembly as claimed in claim 1, wherein the flanges each have an upper surface including a rising segment and a horizontal segment connected to a distal end of the rising segment, when the locking member is rotated and the hooks are moved along the rising segments of the respective flanges, the rising segments enables the locking member to move axially relative to the nut.

5. The anti-loosening bolt and nut assembly as claimed in claim 4, wherein a front end of the rising segment is formed with a restricting step protruding upward along the axial direction of the nut, and the restricting step is configured to prevent the corresponding hook from being detached from the rising segment.

6. The anti-loosening bolt and nut assembly as claimed in claim 4, wherein a spherical protrusion is disposed at a junction of the rising segment and the horizontal segment.

7. The anti-loosening bolt and nut assembly as claimed in claim 1, wherein an opening is disposed between the flanges, and the opening has a width not less than a width of the corresponding hook.

8. The anti-loosening bolt and nut assembly as claimed in claim 1, wherein the tapered section is a slope that is gradually tapered downward and arranged at a lower end of the inner cavity of the locking member.

9. The anti-loosening bolt and nut assembly as claimed in claim 1, wherein a plurality of lugs is disposed on a peripheral surface of the locking member, and the lugs are arranged along an axial direction of the locking member.

10. The anti-loosening bolt and nut assembly as claimed in claim 1, wherein the bolt, the nut and the locking member are made of a plastic material.

* * * * *